United States Patent [19]
Yajima et al.

[11] 4,074,231
[45] Feb. 14, 1978

[54] PATTERN PROCESSING SYSTEM

[75] Inventors: Shunichi Yajima; Shigeru Kakumoto, both of Kokubunji; Yoshiji Fujimoto, Hachioji; Toshihiro Hananoi, Kanagawa, all of Japan

[73] Assignee: Hitachi, Ltd., Japan

[21] Appl. No.: 748,882

[22] Filed: Dec. 9, 1976

[30] Foreign Application Priority Data
Dec. 17, 1975  Japan .................................. 50-149624

[51] Int. Cl.² .............................................. G06K 9/12
[52] U.S. Cl. ................. 340/146.3 AG; 340/146.3 MA
[58] Field of Search ............. 340/146.3 H, 146.3 MA, 340/146.3 R, 146.3 AG

[56] References Cited
U.S. PATENT DOCUMENTS 3,701,095  10/1972  Yamaguchi et al. ....... 340/146.3 MA
3,973,239  8/1976  Kakumoto et al. ........ 340/146.3 MA
4,005,385  1/1977  Joynson et al. ........... 340/146.3 MA

OTHER PUBLICATIONS

Andrews, "Digital Image Restoration: A Survey," *Computer*, May, 1974, pp. 36-45.

*Primary Examiner*—Leo H. Boudreau
*Attorney, Agent, or Firm*—Craig & Antonelli

[57] ABSTRACT

A pattern processing system comprising a filtering processor which enhances the edge of a character signal picked up by an image pickup tube, a comparator which binary-codes the character signal on the basis of threshold values of two different levels, a circuit which provides the logical product between outputs from the filtering processor and the comparator, and a filtering processor which subjects the output of the circuit to a filtering processing by the use of a smoothing filter.

5 Claims, 20 Drawing Figures

FIG. 5
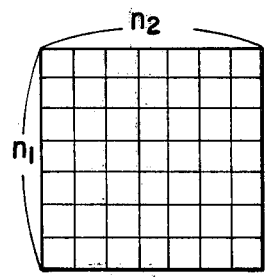
FIG. 6a
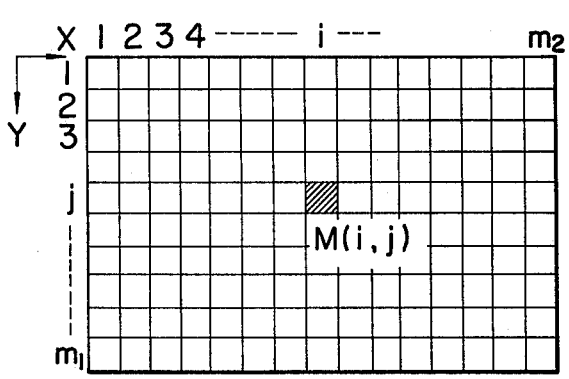
FIG. 6b
FIG. 6D
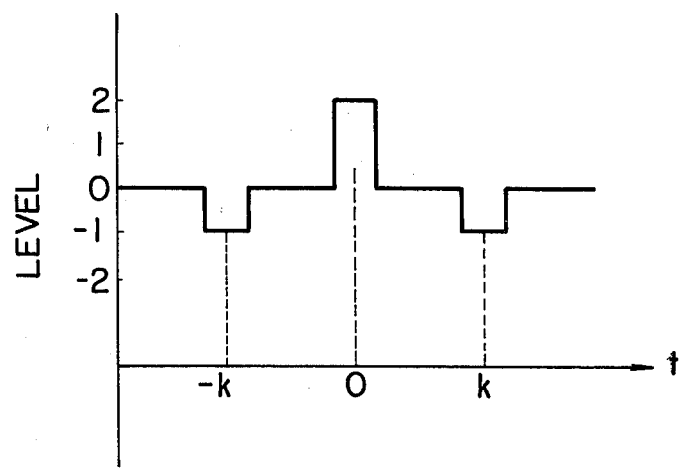

FIG. 7a
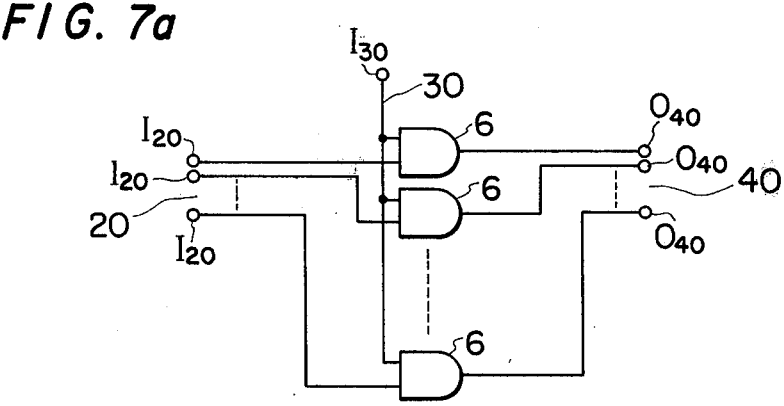
FIG. 7b
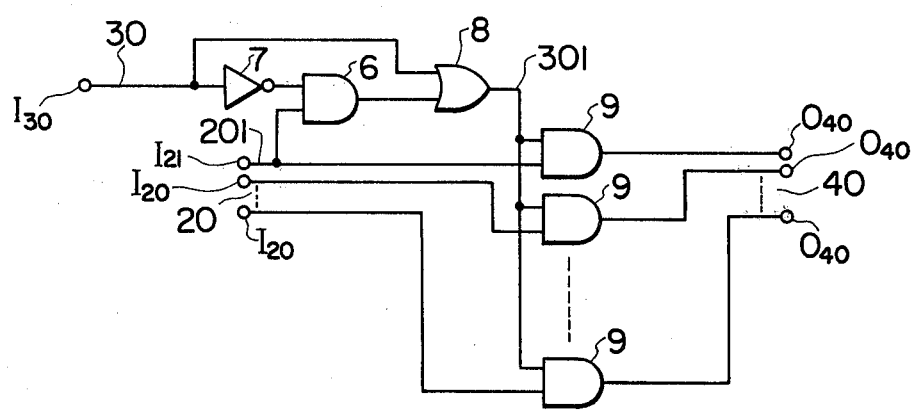
FIG. 8
| 1 | 1 | 1 |
|---|---|---|
| 1 | 2 | 1 |
| 1 | 1 | 1 |

PATTERN PROCESSING SYSTEM

BACKGROUND OF THE INVENTION

1. Field of the Invention

This invention relates to a pattern pre-processing system which is chiefly employed for the recognition of printed characters, hand-written characters, etc. More particularly, it relates to a pattern processing system which performs a noise suppressing processing between the filtering processings of a pattern edge enhancing processing and a smoothing processing.

2. Description of the Prior Art

An optical character reader for recognizing printed characters, hand-written characters etc. receives the characters by a pattern input device which is generally an image pickup tube, a flying spot scanner or the like.

However, in case where the characteristics of the image pickup equipment are inferior or where the conditions of photographing are inferior, a pattern obtained is usually blurry. The blurred pattern represented by $g(x, y)$ is approximated by the convolution integral between a blur function $b(x, y)$ and an original image $f(x, y)$ as indicated by the following equation (1):

$$g(x, y) = \iint b(\tau_x, \tau_y) f(x - \tau_x, y - \tau_y) d\tau_x d\tau_y \quad (1)$$

When Eq. (1) is subjected to the Fourier transform, the convolution integral is expressed by a product as in the following equation (2):

$$G(\omega_x, \omega_y) = B(\omega_x, \omega_y) \cdot F(\omega_x, \omega_y) \quad (2)$$

where capital letters signify the corresponding functions as Fourier-transformed.

From Eq. (2), $$F(\omega_x, \omega_y) = G(\omega_x, \omega_y) / B(\omega_x, \omega_y) \quad (3)$$

is obtained. As an expedient for sharpening the pattern, therefore, a prior-art method has been known in which the blur function and the blurred pattern as presumed are respectively subjected to the Fourier transforms, the operation given by Eq. (3) is executed and lastly the inverse Fourier transform is executed.

In such processing, however, a noise on the pattern is prone to be enhanced. As a countermeasure against this drawback, there has hitherto been proposed a method which combines the processing of enhancing Fourier components existent on the original image in large quantities by the Wiener filtering and the processing indicated by Eq. (3).

This method is effective as the processing for a pattern, such as character pattern and finger print, which is supposed to be constructed of a substantially uniform line width. However, since such a procedure in the frequency domain requires a considerable amount of circuitry for its realization, a filtering processing in the spatial domain corresponding thereto is more practical. A weight distribution by a filter in the spatial domain for a Wiener filter is unidimensionally illustrated by a profile as in FIG. 1a. When the convolution integral is executed with such filter, a pattern of comparatively good quality is obtained. In some cases, however, the noise is not perfectly erased, and an appropriate threshold value for a clipping level does not exist.

More specifically, when a pattern having a shade distribution as shown in FIG. 2a is subjected to the filtering processing, a pattern of a shade distribution as shown in FIG. 2b is obtained. When this pattern is binary-coded by threshold values $\theta_1$ and $\theta_2$ as shown in FIG. 2b, the results become as illustrated in FIG. 2c and FIG. 2d, respectively. In the signal depicted in FIG. 2c, a significant signal component is erased, while in the signal depicted in FIG. 2d, a noise component remains. In FIG. 2a, N represents the noise component and $SC_1$–$SC_3$ represent signals (the significant signal components). In FIG. 2c, the significant signal component $SC_3$ is erased.

When it is intended to reduce the noise level by changing the profile or the weight distribution of the filter, the sharpness of the edge of a line is degraded. On the other hand, when it is intended to sharpen the edge of the line, the noise is enhanced. In this manner, a satisfactory result is difficult to attain.

It will be further explained that the noise is not reduced as described above. The filter $W_1$ of the profile exhibiting the weight distribution as shown in FIG. 1a is decomposed into a filter $W_2$ of a profile as shown in FIG. 1b and a filter $W_3$ of a profile as shown in FIG. 1c. Accordingly, the following equation (4) holds.

$$W_1(x, y) = \iint W_2(\tau_x, \tau_y) \cdot W_3(x - \tau_x, y - \tau_y) d\tau_x d\tau_y \quad (4)$$

Therefore, the result of the filtering processing by the mask $W_1$ agrees with a result obtained in such a way that the result of a filtering processing by the mask $W_2$ is further subjected to a filtering processing by the mask $W_3$. The mask $W_2$ enhances the edge of the line, and simultaneously enhances the noise superposed on the pattern. The mask $W_3$ has the characteristics of a smoothing filter, and has the effect of reducing the noise and the effect of resonating with a certain line width. The aforecited problem is attributed to the fact that the noise is not sufficiently reduced even by such smoothing filter.

SUMMARY OF THE INVENTION

An object of this invention is to provide a pattern processing system which enhances the edge of a line without being influenced by noises, such as smear and stain, on ground paper with characters depicted thereon and which produces a pattern of good quality from a blurred pattern ascribable to the shades of the characters and the contrast thereof to the background.

In order to accomplish such object, this invention performs the processing of suppressing noises after the filtering processing by the mask $W_2$ and subsequently performs the smoothing processing by the mask $W_3$.

BRIEF DESCRIPTION OF THE DRAWINGS

FIGS. 5 and 8 are diagrams each showing the weight distribution of a mask for performing the filtering processing in this invention, FIGS. 6a to 6d are diagrams for explaining the filtering processings according to this invention, and FIGS. 7a and 7b are diagrams each showing the construction of the embodiment in FIG. 4.

PREFERRED EMBODIMENTS OF THE INVENTION

The principle of this invention will be explained.

Now, an input signal S obtained from an image pickup equipment is represented by $g(x, y)$, and a signal $S_1$ obtained as the result of the filtering processing by the foregoing mask $W_2$ is represented by $g_1(x, y)$. That is, $$g_1(x, y) = \int\int W_2(\tau_x, \tau_y) g(x - \tau_x, y - \tau_y) d\tau_x d\tau_y \quad (5)$$

The function $g(x, y)$ is binary-coded by a threshold value $\theta$ into "0", to obtain a function $h(x, y)$ wherein the threshold value $\theta$ denotes the amplitude value of voltage.

$$h(x, y) = \begin{cases} 0; & g(x, y) < \theta \\ 1; & g(x, y) \geq \theta \end{cases} \quad (6)$$

In this manner, white or black is temporarily discriminated at the first stage. From the function $g_1(x, y)$ and the function $h(x, y)$, a function $g_2(x, y)$ for a signal $S_2$ with a noise suppressed is obtained by a processing indicated by the following equation (7) or equation (8):

$$g_2(x, y) = g_1(x, y) \cdot h(x, y) \quad (7)$$

$$g_2(x, y) = (1 - h(x, y)) \cdot Min(0, g_1(x, y)) + g_1(x, y) \cdot h(x, y) \quad (8)$$

where "Min" signifies the minimum numerical value of the two numbers. Both the nonlinear processings indicated by Eqs. (7) and (8) have the effect of suppressing the noise to the zero level. One feature of the nonlinear processing expressed by Eq. (7) is that the actual circuit realization and packaging becomes easy. Since the nonlinear processing expressed by Eq. (8) has the minus part of the function $g_1(x, y)$ left, it has the feature that the sharpness of the edge is good when the smoothing processing is subsequently conducted. The function $g_2(x, y)$ thus obtained is subjected to the filtering processing by the foregoing mask $W_3$, and the final result of processing is obtained.

Figure 3A:
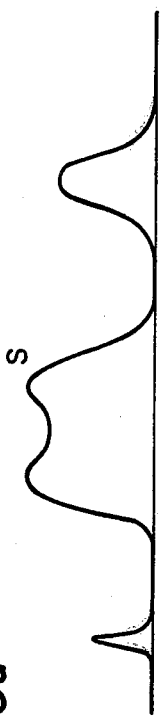
FIGS. 3a to 3d are diagrams showing processings by filterings for explaining this invention.
Figure 3B:
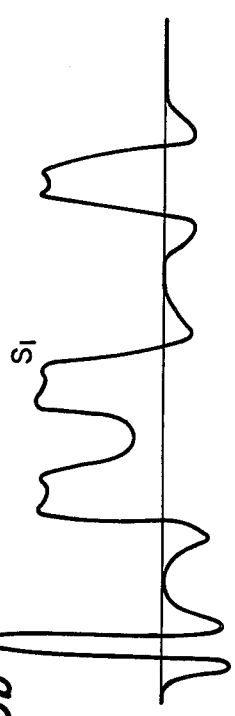
Figure 3C:
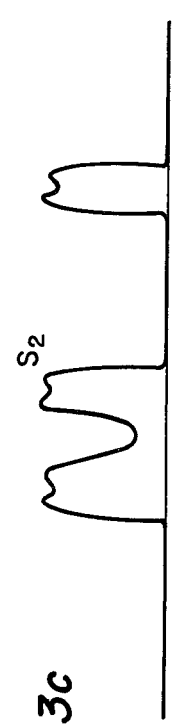
Figure 3D:
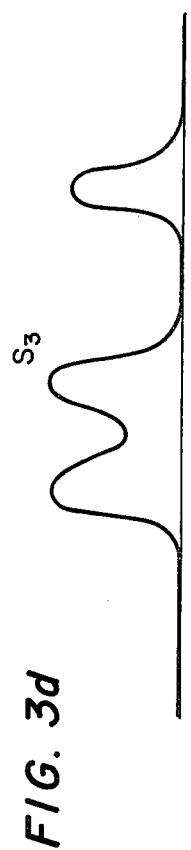
Figure 2A:
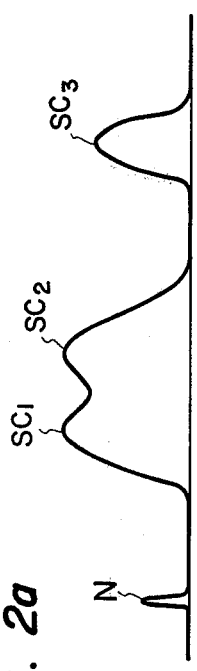
FIGS. 2a to 2d are diagrams for explaining the Wiener filtering processings.
Figure 2B:
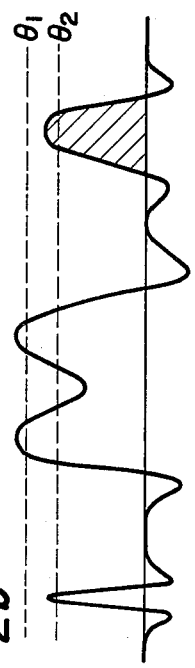
Figure 2C:
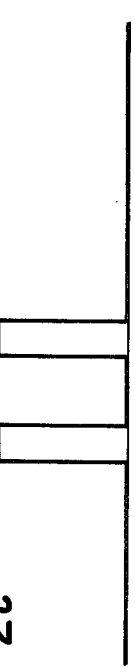
Figure 2D:
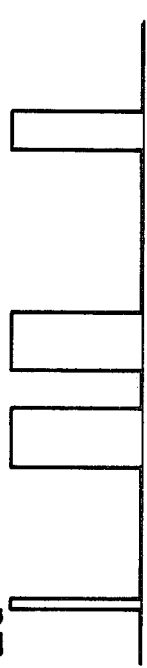

The above processings are illustrated as in FIGS. 3a to 3d in case of employing, for example, the noise suppressing processing of Eq. (7). FIG. 3a shows the original image signal S. FIG. 3b shows the signal $S_1$ which is the result of the filtering processing by the mask $W_2$ and whose edge has been enhanced. FIG. 3c shows the signal $S_2$ obtained by the noise suppressing processing according to Eq. (7). FIG. 3d shows a signal $S_3$ obtained by subjecting the signal $S_2$ to the filtering processing by the mask $W_3$ or the smoothing processing.

Figure 1A:
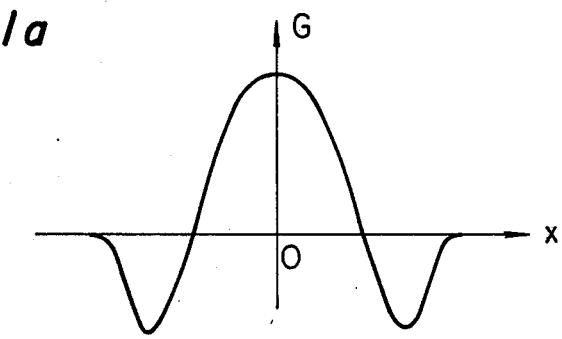
FIGS. 1a to 1c are diagrams showing the profiles of masks for performing filtering processings.
Figure 1B:
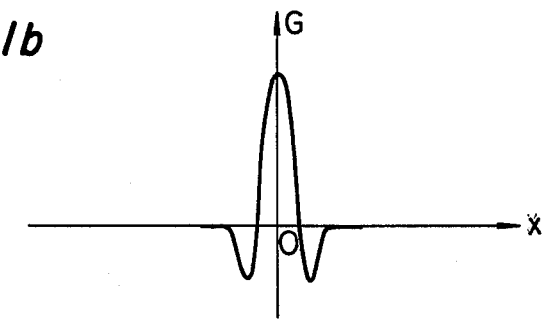
Figure 1C:
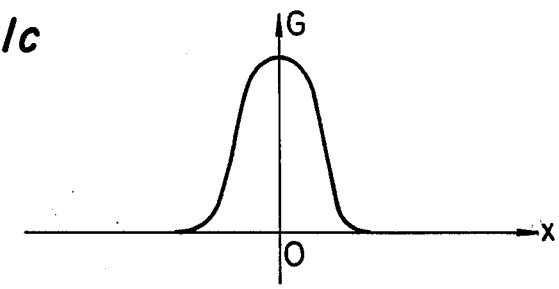
Figure 4:
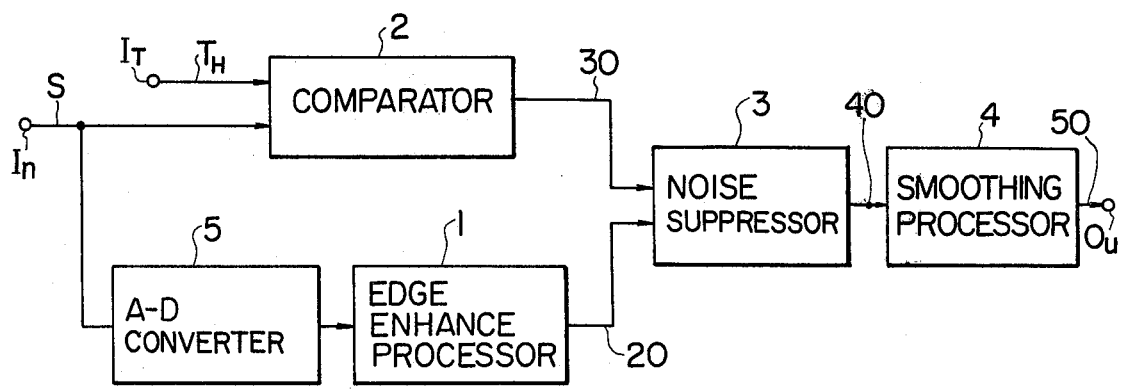
FIG. 4 is a block diagram showing the construction of an embodiment of this invention.

FIG. 4 is a block diagram showing the construction of an embodiment of this invention. Numeral 1 designates an edge enhancing processor, numeral 2 a binary-coding processor (for example, comparator), numeral 3 a noise suppressor, numeral 4 a smoothing processor, and numeral 5 an analog-digital converter. "In" denotes an input terminal of the original image signal S, "$I_T$" an input terminal of the threshold signal $T_H$ which becomes one input to the comparator 2, and "Ou" an output terminal.

In such construction, the original image signal S is applied through the input terminal In to the analog-digital converter 5 and to the comparator 2 as the other input thereof. In the comparator 2, the original image signal S is compared with the threshold value $T_H$ applied through the terminal $I_T$, and it is sorted into a signal of a part recognized to be the pattern and a signal of the other part. When the threshold value $T_H$ is exceeded, i.e., when the signal is recognized to be the pattern, a binary-coded signal 30 is generated. The binary-coded signal 30 becomes one input of the noise suppressor 3. The original image signal S digitized by the analog-digital converter 5 becomes an input of the edge enhancing processor 1. The filtering processing for the edge enhancement in the edge enhancing processor 1 is performed by the use of a mask whose respective regions have weight coefficients as indicated in FIG. 5. Description will now be made of the operation and construction of the edge enhancing processor 1 for such filtering processing.

Assuming that the pattern screen is formed of $m_1 \times m_2$ small regions as shown in FIG. 6a and that the mask is formed of $n_1$-$n_2$ small regions as shown in FIG. 6b, the filtering operation is expressed by the following equation:

$$R(i, j) = \sum_{k=\alpha_1}^{\beta_1} \sum_{l=\alpha_2}^{\beta_2} W(k, l) \cdot D(i + k, j + l) \quad (9)$$

where $1 \leq i \leq m_1$, $1 \leq j \leq m_2$ $\alpha_1 = 1 - n_1/2$, $\beta_1 = n_1/2$ $n_1$: even number
$\alpha_1 = 1 - (n_1 - 1)/2$, $\beta_1 = (n_1 - 1)/2$ $n_1$: odd number
$\alpha_2 = 1 - n_2/2$, $\beta_2 = n_2/2$ $n_2$: even number
$\beta_2 = 1 - (n_2 - 1)/2$, $\beta_2 = (n_2 - 1)/2$ $n_2$: odd number
$D(i, j)$ is a value before processing a given region $M(i, j)$, and $R(i, j)$ after processing the same. $W(k, l)$ is a weight function.

Figure 6C:
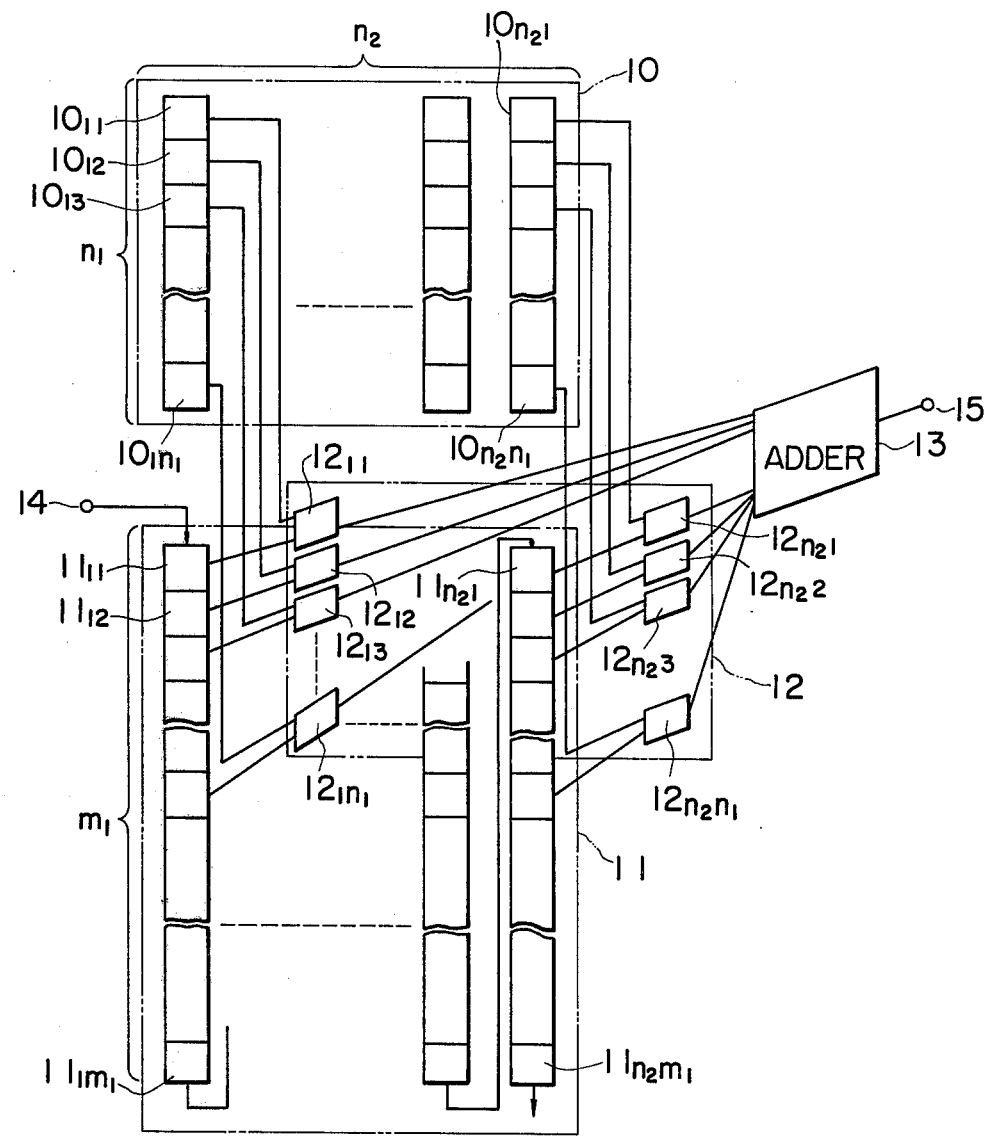

A concrete construction of the filtering unit will now be explained with reference to FIG. 6c. In the figure, number 10 designates a register group which includes registers $10_{11}$ to $10_{n_2 n_1}$ corresponding to and in the same number as the $n_1 \times n_2$ regions. Each of the registers has a depth or capacity of P bits. Here, P is set to be sufficiently large to express the weight of the mask. On the other hand, numeral 11 designates a shift register group which includes shift registers $11_{11}$ to $11_{n_2 m_1}$. A pattern signal obtained by sequentially scanning the screen of FIG. 6a in the direction Y from 1 to $m_1$ is applied to the input terminal 14 of the shift register group 11. The content of each shift register shifts downwards in the drawing in sequence, so that the content of the lowest shift register (for example, $11_{1m_1}$) shifts to the shift register ($11_{21}$) at the top of the immediately right column. It is assumed here that each shift register has a depth or capacity of q bits sufficient to express the shades of the pattern. Numeral 12 indicates a multiplier group which includes $n_1 \times n_2$ multipliers for obtaining the product between the content of the shift register $10_{ij}$ and the content of the shift register $11_{ij}$. The outputs of all the multipliers $12_{11}$ to $12_{n_1 n_2}$ are applied to an adder 13 for producing the sum thereof. Each time data of one picture element (one region in FIG. 6a) is applied to the input terminal 14, the adder 13 provides at its output terminal 15 an output of the corresponding one picture element, which satisfies the equation (1).

In order to enhance the edge by such filtering processing, the capacity of the register group 10 making up the mask, that is, the weight of the mask may be selected as stated below.

The edge enhancing processing is equivalent to taking the second-order differentiation of the pattern. An example of the filtering processing having such function will be explained on a unidimensional model. FIG. 6d unidimensionally shows the profile of a mask for the processing. The mask has a coefficient value of 2 at the center, and a coefficient value of $-1$ at a point distant by $k$ from the center. A signal $g_1(t)$ which is the result of the filtering processing of a signal $g(t)$ by the mask becomes as given by the following equation (10):

$$g_1(t) = -g(t+k) + 2g(t) - g(t-k)$$
$$= k^2 \times \frac{\{g(t) - g(t-k)\} - \{g(t+k) - g(t)\}}{k^2} \quad (10)$$

Here, the second-order differentiation $g''(9t)$ of $g(t)$ is:

$$g''(t) = \lim \frac{\{g(t+l) - g(t)\} - \{g(t) - g(t-k)\}}{k^2} \quad (11)$$

$$k \to 0$$

Accordingly, when $k$ is made small $g_1(t)$ becomes a value which is substantially proportional to $g''(t)$. Here, to make $k$ small is equivalent to making the size of the filter small. In general, when the coefficient value of the center is $n_1 (>0)$ and that of the peripheral part is $n_2 (<0)$, the signal $g_1(t)$ of the result of the processing becomes as given by the following equation (12):

$$g_1(t) = C_1 \times g''(t) + C_2 \times M \times g(t) \quad (12)$$

where $M = n_1 + 2 n_2$, and $C_1$ and $C_2$ denote constants.

The edge enhancing effect is accordingly produced by making opposite the signs of the coefficient values of the central part and the peripheral part of the mask and making the size of the mask small.

For example, the mask shown in FIG. 5 is such mask.

Referring back to FIG. 4, an edge-enhanced signal 20 obtained by the filtering processing in the edge enhancing processor 1 becomes the other input signal of the noise suppressor 3.

In the noise suppressor 3, the noise elimination by the nonlinear processing based on Eq. (7) or Eq. (8) is carried out with the edge-enhanced signal 20 and the binary-coded signal 30. A circuit for performing the noise elimination based on Eq. (7) is shown in FIG. 7a.

In the embodiment of FIG. 7a, the nonlinear processing is realized by the logical product, and a logical product circuit is shown at 6. Eq. (7) is executed by taking the logical products between respective bit signals of the edge-enhanced signal 20 and the binary-coded signal 30. The respective bit signals are applied to the logical product circuit through a plurality of input terminals $I_{20}$, and the binary-coded signal 30 is applied to the same through an input terminal $I_{30}$. The logical product signals 40 at the respective bits are derived from a plurality of output terminals $O_{40}$.

A circuit which realizes a noise elimination using the nonlinear processing based on Eq. (8) is shown in FIG. 7b. In the embodiment of FIG. 7b, the nonlinear processing is achieved by combining the logical sum and the logical product, and the same symbols as in FIG. 7a designate the same or equivalent parts. Numeral 7 represents a logical inverter or NOT circuit, numeral 8 represents a logical sum or OR circuit, and numeral 9 represents logical product or AND circuits in the same number as that of bits of the edge-enhanced signal 20. Shown at $I_{21}$ are input terminals to which sign signals 201 of respective bit signals of the edge-enhanced signal 20 are applied. In such construction, the binary-coded signal 30 is negated by the NOT circuit 7, and the logical product between the negation signal of the binary-coded signal and the sign signal 201 is provided from the circuit 6. The logical sum between the output of the logical product circuit 6 and the binary-coded signal 30 is produced by the logical sum circuit 8. An output signal 301 from the logical sum circuit 8 becomes an input signal of each of the logical product circuits 9. Further, each of the logical product circuits 9 receives the bit signal and the sign signal of the corresponding bit signal of the edge-enhanced signal 20. Eq. (8) is executed by taking the logical products between the edge-enhanced signals 20 and the output signal 301 of the logical sum circuit 8. The resultant logical products are provided at output terminals $O_{40}$. The sign signal 201 becomes "0" when the bit signal is greater than zero, and becomes "1" when it is negative. In this way, the logical products from the output terminals $O_{40}$ in FIG. 7a or FIG. 7b form a noise-eliminated signal 40 shown in FIG. 4. The noise-eliminated signal 40 becomes an input signal of the smoothing processor 4 shown in FIG. 4. In the smoothing processor 4, the filtering processing is performed by the use of a smoothing mask whose respective regions have weight coefficients as indicated in FIG. 8. The filtering processing employing the smoothing mask is carried out as described below. Since the mask of FIG. 8 is obtained by altering the stored contents of the respective registers $10_{11}$ to $10_{n_2 n_1}$ of the apparatus shown in FIG. 6c, the filtering processing is performed with the apparatus of FIG. 6c by the operation explained previously. An output signal 50 from the smoothing processor 4 is delivered from the output terminal $Ou$. In case where the smoothing of the smoothed signal 50 is unsatisfactory, the smoothing processing may be conducted a plurality of time by introducing the signal 50 into the smoothing processor 4 as the signal 40.

As set forth above, according to this invention, the pattern of good quality can be obtained from the blurred pattern, and it can be fed to the optical character reader.

We claim:

1. A pattern processing system comprising:
   first processing means to subject a pattern input signal to a filtering processing of enhancing an edge of a pattern,
   binary-coding means to binary-code said pattern input signal by a predetermined threshold value,
   noise suppressing means to suppress noises by a nonlinear processing of outputs from said first processing means and said binary-coding means, and
   second processing means to subject an output from said noise suppressing means to a filtering processing for performing a smoothing processing.

2. The system according to claim 1, wherein said first processing means performs said filtering processing by the use of a mask in which weight coefficients of respective regions of said mask are set so as to be a positive value at a central part and to be negative values at parts surrounding said central part.

3. The system according to claim 1, wherein said second processing means performs said filtering processing by the use of a mask in which all weight coefficients of respective regions of said mask are values greater than zero.

4. The system according to claim 1, wherein said noise suppressing means is a logical circuit which realizes said nonlinear processing in the form of logical products between outputs from said first processing means and outputs from said binary-coding means.

5. The system according to claim 1, wherein said noise suppressing means comprises a first logical circuit which takes logical products between signals obtained by negating outputs from said binary-coding means and signals indicative of signs of outputs from said first processing means, a second logical circuit which takes logical sums between said outputs from said binary-coding means and output signals from said first logical circuit, and a third logical circuit which takes logical products between output signals of said second logical circuit and said signals indicative of signs and said outputs from said first processing means.

* * * * *